(No Model.) 2 Sheets—Sheet 2.
R. DRALLE.
APPARATUS FOR COMPOUNDING AND MIXING GLASS BATCH.
No. 520,138. Patented May 22, 1894.
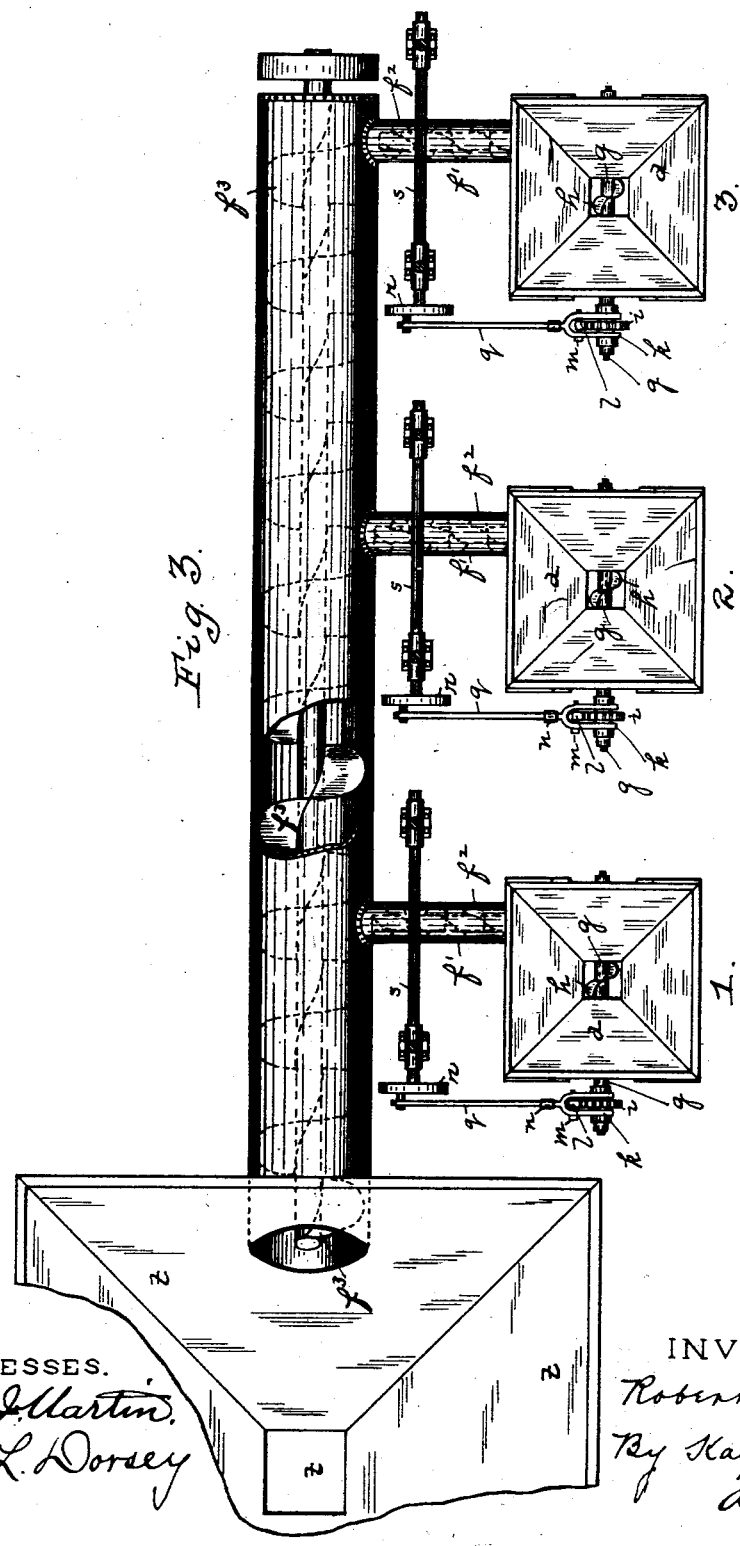
WITNESSES.
Wm J Martin
D. L. Dorsey
INVENTOR.
Robert Dralle.
By Kay, Totten Hooks
Attorneys.

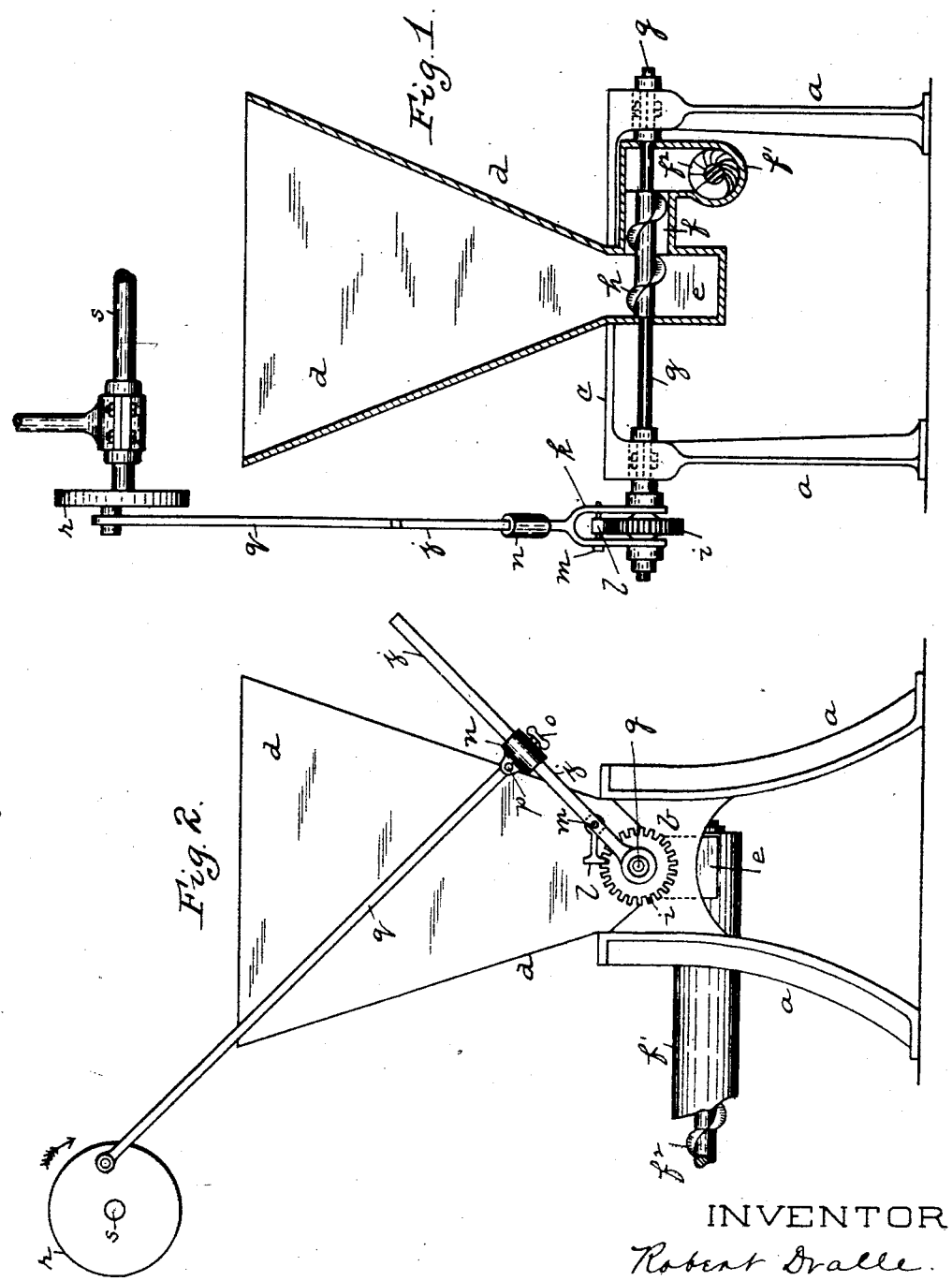

UNITED STATES PATENT OFFICE.

ROBERT DRALLE, OF BERLIN, GERMANY, ASSIGNOR OF ONE-HALF TO RICHARD M. ATWATER, OF PITTSBURG, PENNSYLVANIA.

APPARATUS FOR COMPOUNDING AND MIXING GLASS BATCH.

SPECIFICATION forming part of Letters Patent No. 520,138, dated May 22, 1894.

Application filed February 25, 1893. Serial No. 463,779. (No model.)

*To all whom it may concern:*

Be it known that I, ROBERT DRALLE, a resident of Berlin, in the Kingdom of Prussia and Empire of Germany, have invented a new and useful Improvement in Apparatus for Compounding and Measuring Glass Batch; and I do hereby declare the following to be a full, clear, and exact description thereof.

My invention relates to measuring apparatus, its object being to provide an apparatus by which materials or ingredients which go to make up different compounds may be measured out automatically in the desired proportions.

To this end my invention comprises, generally stated a hopper to receive the material, a spiral screw or conveyer arranged at the lower end of said hopper, and mechanism for imparting an intermittent rotary movement to said spiral screw or conveyer whereby a certain proportion of the material in said hopper is ejected therefrom by said spiral screw or conveyer to a suitable receptacle, and mechanism for increasing or diminishing the amount of rotation of said spiral screw or conveyer according to the proportion of the material desired to be ejected therefrom in making up the entire mixture.

My invention further consists in the arrangement of two or more automatic measuring machines with reference to a common conveyer whereby the materials are fed in their proper proportions to a suitable mixing receptacle.

To enable others skilled in the art to make and use my invention, I will describe the same more fully, referring to the accompanying drawings, in which—

Figure 1 is a front view partly in section of my improved apparatus. Fig. 2 is a side view thereof, and Fig. 3 is a plan view of several measuring machines feeding into a common conveyer connected with a suitable receptacle.

Like letters and figures indicate like parts in each of the views.

The measuring apparatus consists of any suitable frame composed of the standards $a$ connected by the cross braces $b$ and having the top piece $c$ which supports the hopper $d$. The hopper $d$ is provided with the box $e$ at the lower end thereof and communicating with said box is the cylinder $f$. And in order to provide a means of conveying away the material fed from the hopper by the spiral screw $h$, as will more fully hereinafter appear, a cylinder $f'$ containing the spiral conveyer $f^2$ may be arranged to communicate with the cylinder $f$. A shaft $g$ is journaled in the frame within the cross braces $b$, said shaft carrying the spiral screw or conveyer $h$ which is adapted to rotate within the box $e$ and the cylinder $f$, said cylinder being accurately bored out so that said spiral screw or conveyer fits snugly therein. One end of the shaft $g$ projects beyond the frame of the apparatus and has secured thereto the ratchet wheel $i$. A lever $j$ provided with the bifurcated end $k$ is fitted loosely on the shaft $g$, the bifurcated end $k$ of said lever $j$ engaging with said shaft $g$ on both sides of the ratchet wheel $i$. A pawl or ratchet $l$ is mounted on the pin $m$ passing through the bifurcated end $k$ of the lever $j$, said ratchet or pawl being adapted to engage with the teeth of the ratchet wheel $i$. Surrounding the lever $j$ is the sleeve $n$ adapted to move up and down on said lever and to be secured at any desired point thereon by means of the set screw $o$. The sleeve $n$ is formed with the tongue $p$ thereon to which is pivoted one end of the connecting rod $q$, said rod being pivoted at its opposite end to an eccentric $r$, mounted on the driving shaft $s$.

The mechanism for imparting rotary movement to the spiral screw or conveyer may be changed and other forms of mechanism substituted to produce the same effect without going beyond the scope of my invention, therefore I do not confine myself to the particular mechanism set forth and described.

The raw material to be measured is introduced into the hopper $d$ whence it passes down into the box $e$. Power is then applied to drive the shaft $s$ and the eccentric $r$ carried thereby. As the eccentric $r$ revolves in the direction of the arrow, Fig. 2, the rod $q$ connected thereto following the line of rotation of said eccentric imparts a reciprocating movement to the lever $j$. By this reciprocating movement, the pawl $l$ engaging with the ratchet wheel $i$ imparts an intermittent rotary movement to said ratchet wheel $i$ and consequently to the shaft $g$. Thus when the lever $j$ is drawn by the connecting rod $q$ toward the left, the pawl $l$ will drive the ratchet wheel $i$ in the same direction, but when the lever $j$ returns to its former position, by the further rotation of the eccentric $r$ the pawl $l$ moves over the teeth of the ratchet wheel $i$ without imparting any movement to said wheel. The spiral screw or conveyer on the same shaft $g$ has imparted to it a like intermittent movement whereby upon each movement of the ratchet wheel $i$ a predetermined proportion of the material introduced into the hopper is ejected from the cylinder $f$ into the cylinder $f'$ or other suitable receptacle.

The apparatus is intended principally for the compounding of mixtures which are made up of several different ingredients, such as in making up what is termed the "batch" in the manufacture of glass. For illustration, a common batch for bottle glass is made up of one hundred parts sand, 33.3 parts lime, and twenty parts soda, and, in order to make this batch with the proper proportion of the above ingredients, three of the above described machines are placed side by side, as shown in Fig. 3, the feeds of the several machines being adjusted in the proper ratio. To obtain this proper ratio, the lever $j$ may have formed thereon a graduated scale whereby upon moving the sleeve $n$ from one point to another of said scale the alternation in the rotary movement of the spiral screw or conveyer can be determined by a fixed standard. As above stated, three machines, 1 2 3, are placed side by side and the ingredients ejected from each machine in the proper proportions may be fed into a common transport screw $f^3$ and carried to a suitable receptacle $t$ where they may be properly mixed. If it is desired to change the proportions or vary them for compounding other mixtures, it is only necessary to adjust the sleeve $n$ at the proper point on the lever $j$ to produce the required change.

The spiral screw can be set in any position, horizontal, perpendicular, or otherwise, so that I do not confine myself to its employment in the particular position shown.

What I claim as my invention, and desire to secure by Letters Patent, is—

1. In measuring apparatus the combination with a suitable frame, of a hopper having an outlet, a spiral screw or conveyer adapted to feed the material from said hopper, and mechanism for imparting an intermittent rotary movement to said spiral screw or conveyer, substantially as and for the purposes set forth.

2. In measuring apparatus the combination with a suitable frame, of a hopper, a spiral screw or conveyer adapted to feed the material from said hopper, mechanism for imparting an intermittent rotary movement to said spiral screw or conveyer and for regulating the amount of such movement, substantially as and for the purposes set forth.

3. In measuring apparatus the combination with a suitable frame, of a hopper, a cylinder communicating with said hopper, a spiral screw or conveyer fitting within said cylinder, and mechanism for imparting an intermittent rotary movement to said spiral screw or conveyer, substantially as and for the purposes set forth.

4. In measuring apparatus the combination with a suitable frame, of a hopper having a box or receptacle formed at the lower end thereof, a cylinder communicating with said box or receptacle, a spiral screw or conveyer arranged within said box and cylinder, and mechanism for imparting an intermittent rotary movement to said spiral screw or conveyer, substantially as and for the purposes set forth.

5. In measuring apparatus the combination with a suitable frame, of a hopper, a shaft carrying a spiral screw or conveyer, said spiral screw or conveyer being adapted to feed the material from said hopper, a ratchet wheel on said shaft, a lever on said shaft carrying a pawl adapted to engage with said ratchet wheel, and connections between said lever and a suitable power shaft for imparting a reciprocating movement to said lever, substantially as and for the purposes set forth.

6. In measuring apparatus the combination with a suitable frame, of a hopper, a shaft carrying a spiral screw or conveyer, said spiral screw or conveyer being adapted to feed the material from said hopper, a ratchet wheel on said shaft, a lever on said shaft carrying a pawl adapted to engage with said ratchet wheel, and a rod connecting said lever with an eccentric mounted on a suitable power-driven shaft, substantially as and for the purposes set forth.

7. In measuring apparatus the combination with a suitable frame, of a hopper, a shaft carrying a spiral screw or conveyer, said spiral screw or conveyer being adapted to feed the material from said hopper, a ratchet wheel on said shaft, a bifurcated lever on said shaft carrying a pawl adapted to engage with said ratchet wheel, an adjustable sleeve on said lever and a rod connecting said sleeve with an eccentric on a suitable power-driven shaft, substantially as and for the purposes set forth.

8. In measuring apparatus the combination with a suitable frame, of a hopper having a box or receptacle formed at the lower end thereof, a cylinder communicating therewith, a spiral screw or conveyer arranged within said box and cylinder, mechanism for imparting an intermittent rotary movement to said spiral screw or conveyer, and a spiral conveyer adapted to carry off the material fed from said hopper by said first mentioned conveyer, substantially as and for the purposes set forth.

In testimony whereof I, the said ROBERT DRALLE, have hereunto set my hand.

ROBERT DRALLE.

Witnesses:
 KRACHT,
  *Office Director.*
 WAGNER,
  *Bureau Director.*